United States Patent
Inoue et al.

(10) Patent No.: US 7,777,796 B2
(45) Date of Patent: Aug. 17, 2010

(54) SOLID-STATE IMAGE PICKUP APPARATUS INCLUDING A GLOBAL SHUTTER FUNCTION AND CONTROL METHOD THEREFOR

(75) Inventors: Tadao Inoue, Kawasaki (JP); Katsuyoshi Yamamoto, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 745 days.

(21) Appl. No.: 11/545,692

(22) Filed: Oct. 11, 2006

(65) Prior Publication Data
US 2008/0002043 A1    Jan. 3, 2008

(30) Foreign Application Priority Data
Jun. 30, 2006    (JP)    ............................. 2006-180810

(51) Int. Cl.
*H04N 3/14*    (2006.01)
(52) U.S. Cl. .................................................... 348/296
(58) Field of Classification Search ................ None
See application file for complete search history.

(56) References Cited

U.S. PATENT DOCUMENTS

| 6,552,323 B2 * | 4/2003 | Guidash et al. .......... 250/208.1 |
| 7,428,378 B1 * | 9/2008 | Warpakowski Furlan .... 396/157 |
| 7,453,514 B2 * | 11/2008 | Furlan et al. ................ 348/367 |
| 7,532,240 B2 * | 5/2009 | Chiba et al. ................. 348/246 |
| 2006/0202038 A1 * | 9/2006 | Wang et al. ............. 235/462.24 |

FOREIGN PATENT DOCUMENTS

| JP | 07-078954 A | 3/1995 |
| JP | 2003-332546 A | 11/2003 |
| JP | 2004-014802 A | 1/2004 |

\* cited by examiner

*Primary Examiner*—Justin P Misleh
(74) *Attorney, Agent, or Firm*—Fujitsu Patent Center

(57) ABSTRACT

A solid-state image pickup apparatus includes a pixel unit consisting of a plurality of pixels; a pixel control unit for controlling the plurality of pixels; a readout unit for reading a signal of each pixel output from the pixel unit; a shutter unit for establishing a state of a light incident to the pixel unit and that of shielding the pixel unit from the light; and a control unit. The control units includes an exposure mode changeover unit for changing over an exposure mode to either a first exposure mode performing a simultaneous exposure for all pixels or a second exposure mode performing an exposure for each of a predetermined unit of pixels. The control unit controls the pixel control unit, readout unit and shutter unit according to an exposure mode changed over by the exposure mode changeover unit.

14 Claims, 12 Drawing Sheets

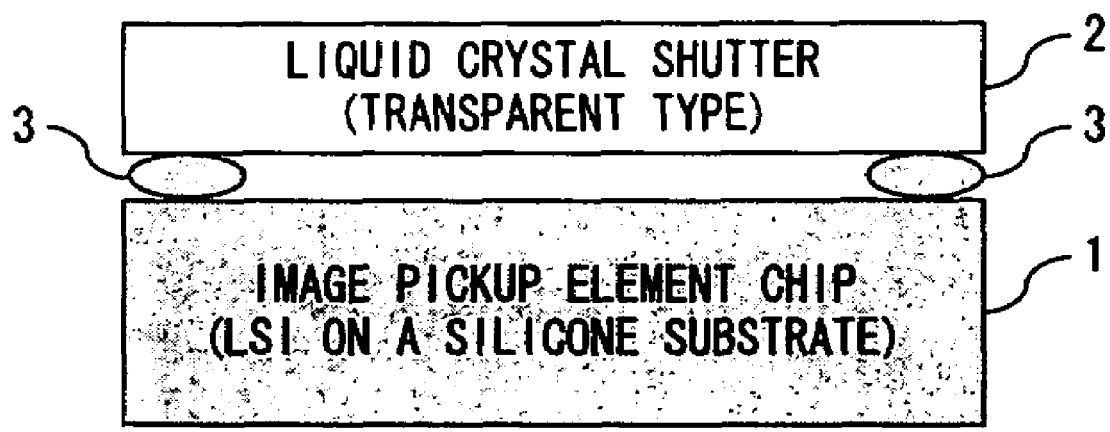
F I G. 5

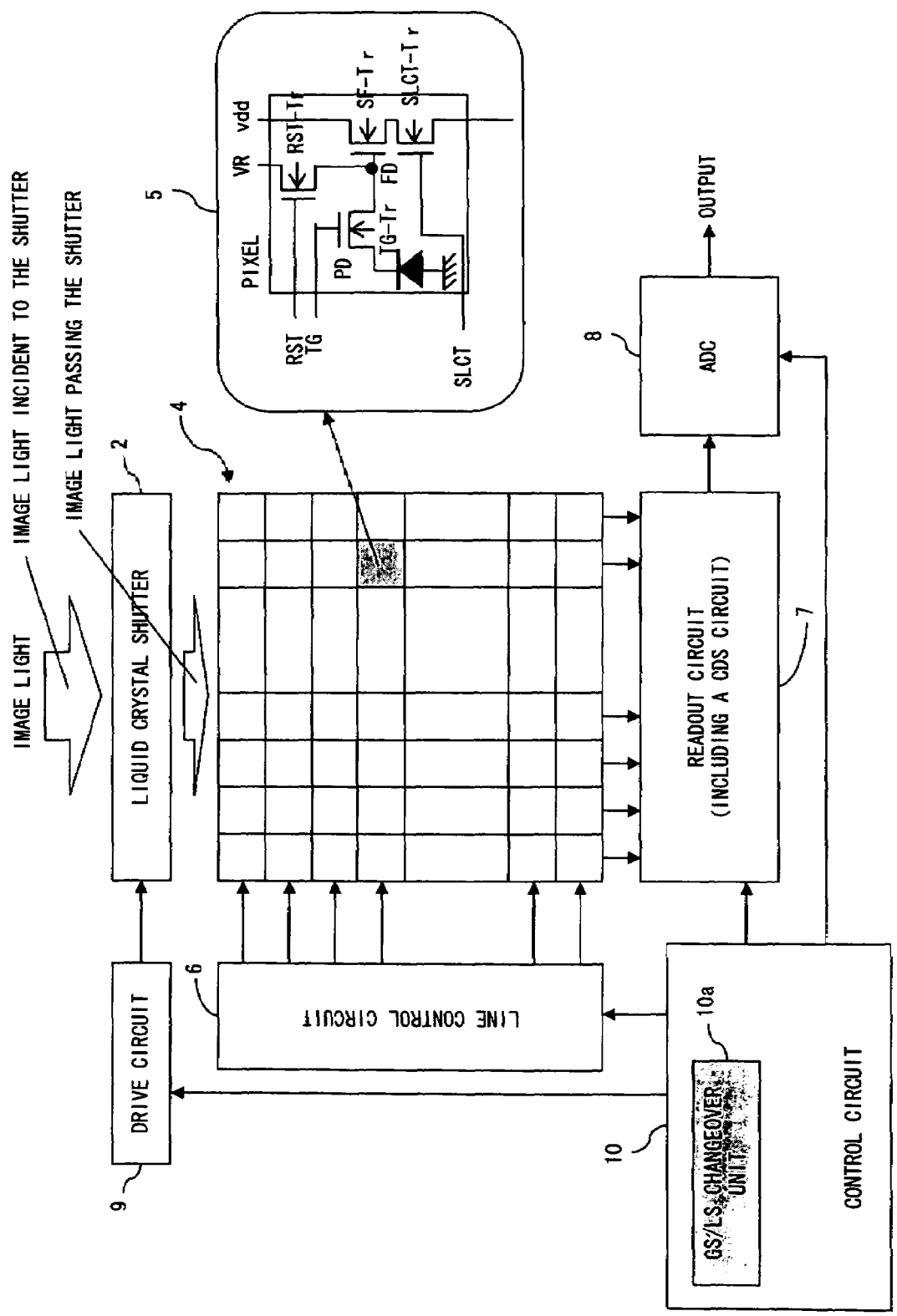
F I G. 6

SOLID-STATE IMAGE PICKUP APPARATUS INCLUDING A GLOBAL SHUTTER FUNCTION AND CONTROL METHOD THEREFOR

CROSS-REFERENCE TO RELATED APPLICATIONS

This application is based upon and claims the benefit of priority from the prior Japanese Patent Application No. 2006-180810 filed on Jun. 30, 2006, the entire contents of which are incorporated herein by reference.

BACKGROUND OF THE INVENTION

1. Field of the Invention

The present invention relates to a solid-state image pickup apparatus and a control method therefor.

2. Description of the Related Art

Conventionally known as an image sensor used for a solid-state image pickup apparatus is a Complementary Metal Oxide Semiconductor (CMOS) image sensor. Exposure methods for a CMOS image sensor include a rolling shutter system (which is also called a line shutter system) and a global shutter system (which is also called a simultaneous shutter system or lumped shutter system). The rolling shutter system is a system performing a series of image pickup sequence, i.e., reset, exposure and readout, sequentially for each line, which is the most common system among the CMOS image sensors. Meanwhile, the global shutter system is a system resetting, exposing and transferring a charge to shaded nodes, all simultaneously, for all pixels, which is a system capable of a simultaneous exposure for all pixels.

Now a description is of an example configuration of a pixel circuit for a CMOS image sensor adopting each of the systems by referring to FIGS. 1 through 4.

FIG. 1 is a diagram exemplifying a 3Tr type pixel circuit which is a pixel circuit, for one pixel, of a CMOS image sensor adopting a rolling shutter system. As shown in FIG. 1, the 3Tr type pixel circuit comprises a photo diode (called "PD" hereinafter) which is a photoelectric conversion element for generating a charge by being radiated with light, a readout node (called "FD" (FD: Floating Diffusion) hereinafter) constituting a signal readout point (which is also a charge accumulation (i.e., a detection of light) point in this circuit configuration), a reset-use transistor (called "RST-Tr" hereinafter) which is a reset-use element for resetting the FD, an amplification-use transistor (called "SF-Tr" (SF: Source Follower) hereinafter) which is an amplification-use element of which the gate terminal is connected to the FD and a selection use transistor (called "SLCT-Tr" hereinafter) which is a selection-use element for selecting one line from among a plurality of lines commonly connected to each column output of a pixel unit (not shown herein) of the CMOS image sensor. Note that the RST-Tr, SF-Tr and SLCT-Tr are n-channel Metal Oxide Semiconductor (MOS) transistors. Referring to FIG. 1, the VDD indicates the power supply voltage, the SLCT indicates a signal for controlling the SF-Tr, the VR indicates a reset voltage, the RST indicates a signal for controlling the RST-Tr.

In the 3Tr type pixel circuit comprising such a circuit configuration, the terminal of the PD is the same node as the source terminal of the RST-Tr, reaching at the Silicon surface (i.e., the surface of the CMOS image sensor substrate), and therefore it is not possible to structure so as to bury a PD within the Silicon substrate. Consequently, the PD in such a configuration has an important problem of a large dark-current noise caused by a crystallization defect, a large number of which exists on the Silicon surface.

Meanwhile, a readout circuit (not shown herein) of a CMOS image sensor in many cases uses a Correlated Double Sampling (CDS) circuit canceling a noise by reading a signal twice, i.e., at the time of a charge generated by an exposure existing in the FD and that of not existing therein (i.e., at a reset), and subtracting the latter from the former readings when reading out a signal. A CMOS image sensor constituted by the 3Tr type pixel circuit is face with the problem of a reset noise (i.e., a kTC noise) remaining instead of being canceled, although a noise caused by a variation of the SF-Tr elements can be canceled by the aforementioned CDS circuit. The reason is that the process sequence for a consecutive readout of a signal:

(1) at the time of a charge generated by an exposure existing in the FD, and (2) at the time of a reset is the (1) followed by (2) after a relatively long exposure time, in which event a kTC noise, which is random time-wise (i.e., no correlation with time), is generated in each of the signals at the time of a reset prior to the exposure and at the time of a reset in the (2) above.

Also, only three transistors are required for the 3Tr type pixel circuit, and therefore an optical reception area of the PD can be made large; the global shutter system, however, cannot be adopted as it is because a charge retention area is not equipped as in a 5Tr type pixel circuit shown in a later described FIG. 4.

FIG. 2 is a diagram exemplifying a 4Tr type pixel circuit which is a pixel circuit, for one pixel, of a CMOS image sensor adopting a rolling shutter system. As shown in FIG. 2, the 4Tr type pixel circuit is configured to add one transfer-use transistor (called "TG-Tr" (TG: Transfer Gate) hereinafter), which is a transfer-use element, to the 3Tr type pixel circuit shown by FIG. 1. Note that the TG-Tr is a transistor for transferring a charge from the PD to FD and is also an n-channel MOS transistor. Also in FIG. 2, the TG is a signal for controlling the TG-Tr. In this circuit configuration, the FD is placed in a different position from the charge accumulation (i.e., a detection of light) point as a result of the TG-Tr being equipped between the PD and FD.

In the 4Tr type pixel circuit comprising such a circuit configuration, the PD is connected to the FD by way of the TG-Tr, the node of the PD is electrically insulated from the Silicon surface if the TG-Tr is controlled to be OFF, hence making it possible to make a structure of burying the PD in the inside of the Silicon substrate. Due to this, the PD in such a structure is not hardly affected by a dark-current noise caused by a crystallization defect, a large number of which exists on a Silicon surface.

In a CMOS image sensor constituted by the 4Tr type pixel circuit, it is possible to cancel not only a noise caused by a variation of elements of the SF-Tr but also a kTC noise by using the CDS circuit. The reason is that the configuration of the 4Tr type pixel circuit (1) reads a signal at the time of a reset by resetting the FD, followed by (2) controlling the TG-Tr as ON, transfer a charge generated by an exposure to the FD and read a signal after the transfer, prior to a signal readout, that is, the sequence of (1) followed by (2), thus carrying out a signal readout at the time of a reset and a signal readout after a charge transfer by one reset.

Meanwhile, the 4Tr type pixel circuit requires no more than four transistors, making it possible to enable the optical reception area size to be a little larger; this configuration as is, however, cannot adopt a global shutter system because a charge retention area is not equipped as in the 5Tr type pixel circuit shown by a later described FIG. 4.

FIG. 3 is a diagram exemplifying a 4Tr-Tr common use type pixel circuit which is a pixel circuit, for two pixels, of a CMOS image sensor adopting a rolling shutter system. As shown in FIG. 3, the 4Tr-Tr common use type pixel circuit is configured to add one PD and one TG-Tr to the 4Tr type pixel circuit shown in FIG. 2. In this circuit configuration, the TG1-Tr is a transistor for transferring a charge from the PD1 to the FD, and the TG2-Tr is a transistor for transferring a charge from the PD2 to the FD. Note that the TG1-Tr and TG2-Tr are both n-channel MOS transistors. Also, referring to FIG. 3, the TG1 is a signal for controlling the TG1-Tr, and the TG2 is a signal for controlling the TG2-Tr.

In the 4Tr-Tr common use type pixel circuit comprising such a circuit configuration, the RST-Tr, SF-Tr, and SLCT-Tr can be commonly used for two pixels, and therefore it is possible to increase the number of saturation charges and sensitivity and improve an S/N ratio because the optical reception area size of the PD can be increased relative to the 4Tr type pixel circuit shown in the above described FIG. 2 in the case of a pixel size being the same. In the case of an optical reception area size being the same, it is possible to reduce a pixel size, thereby making it possible to accomplish a miniaturization and low cost.

As for the 4Tr-Tr common use type pixel circuit, it is possible to make a structure of burying the PD 1 and PD 2 in the inside of a Silicon substrate in the same manner as the 4Tr type pixel circuit shown in FIG. 2, and therefore there is little influence of a dark-current noise caused by a crystallization defect, a large number of which exists on a Silicon surface.

Also, the 4Tr-Tr common use type pixel circuit, as is, cannot adopt a global shutter system because a charge retention area is not equipped as in the 5Tr type pixel circuit shown by a later described FIG. 4.

As such, in the CMOS image sensor of the rolling shutter system described by referring to FIGS. 1 through 3 or other image sensors adopting the rolling shutter system, the exposure timings are different in the top and bottom directions of an image as is apparent from the exposure system, and therefore a problem is that a photographed object is unnaturally distorted when photographing a moving object.

FIG. 4 is a diagram exemplifying a 5Tr type pixel circuit which is a pixel circuit, for one pixel, of a CMOS image sensor adopting a global shutter system. As shown in FIG. 4, the 5Tr type pixel circuit is configured to add one TG-Tr to the 4Tr type pixel circuit shown in FIG. 2. In this circuit configuration, the TG1-Tr transfers a charge from the PD to a charge retention area (called "FD 1" hereinafter), and the TG2-Tr transfers a charge from the FD 1 to a readout node (called "FD 2" hereinafter). Note that the TG1-Tr and TG2-Tr are both n-channel MOS transistors. Also in FIG. 4, the TG1 is a signal for controlling the TG1-Tr and the TG2 is a signal for controlling the TG2-Tr.

In a CMOS image sensor constituted by such configured 5Tr type pixel circuit, a charge is simultaneously transferred from the PD to the FD 1 in all pixel circuit, and therefore the exposure timing is identical for all pixels, hence no distortion of the photographed image occurring even when photographing a moving object.

And in the 5Tr type pixel circuit, the PD is connected to the FD by way of the TG1-Tr and TG2-Tr, and therefore a node of the PD is electrically insulated from the Silicon surface if the TG1-Tr and TG2-Tr are controlled to be OFF, thus enabling a configuration of burying the PD in the inside of the Silicon substrate. Due to this, the PD configured as such is little influenced by a dark-current noise caused by a crystallization defect, a large number of which exists on a Silicon surface.

Meanwhile, the 5Tr type pixel circuit requires five transistors, limiting an expansion of the optical reception area size of the PD; it, however, can adopt either a rolling shutter system or global shutter system since it is equipped with the FD 1 which is a charge retention area.

Incidentally, techniques relating to a conventional solid-state image pickup apparatus include ones noted in Laid-Open Japanese Patent Application Publications No. 07-78954, No. 2003-332546 and No. 2004-14802, for example.

As described above, the CMOS image sensor, as is, constituted by each of the pixel circuits, i.e., 3Tr type, 4Tr type, 4Tr-Tr common use type, cannot adopt a global shutter system, thus precluding an accomplishment of a low noise image pickup element comprising a global shutter function (i.e., a function capable of a simultaneous all pixel exposure).

Although a global shutter function can conceivably be accomplished by adding a mechanical shutter to a CMOS image sensor constituted by each of the pixel circuits, i.e., 3Tr type, 4Tr type, 4Tr-Tr common use type; such a concept, however, is faced with the problems of a cost increase, a larger size, et cetera.

In the meantime, a CMOS image sensor constituted by the 5Tr type pixel circuit can adopt a global shutter system, thereby making it possible to accomplish a global shutter function; it, however, cannot make a pixel size small, thus facing the problems of precluding a miniaturization and a low cost.

SUMMARY OF THE INVENTION

In consideration of the situation as described above, the purpose of the present invention is to provide a compact and low noise solid-state image pickup apparatus comprising a global shutter function and a control method therefor.

In order to accomplish the above noted purpose, a solid-state image pickup apparatus according to a first aspect of the present invention comprises a pixel unit consisting of a plurality of pixels; a pixel control unit for controlling the plurality of pixels; a readout unit for reading a signal of each pixel output from the pixel unit; a shutter unit for establishing a state of a light incident to the pixel unit and that of shielding the pixel unit from the light; and a control unit, comprising an exposure mode changeover unit for changing over an exposure mode to either a first exposure mode performing a simultaneous exposure for all pixels or a second exposure mode performing an exposure for each of a predetermined unit of pixels, for controlling the pixel control unit, readout unit and shutter unit according to an exposure mode changed over by the exposure mode changeover unit.

This apparatus makes it possible to carry out an exposure by a method for performing a simultaneous exposure of all pixels such as the global shutter system or method for performing an exposure for each of a predetermined unit of pixels such as the rolling shutter system by controlling individual units, such as a shutter unit, according to an exposure mode changed over by the exposure mode changeover unit.

A solid-state image pickup apparatus according to a second aspect of the present invention, in the aforementioned first aspect, wherein the control unit controls the pixel control unit, readout unit and shutter unit so as to have the shutter unit establish a state of shielding the pixel unit from a light and resets the plurality of pixels, followed by having the shutter unit establish a state of a light incident to the pixel unit and carrying out a simultaneous exposure of the plurality of pixels, and followed by having the shutter unit establish a state of shielding the pixel unit from a light and reading a signal of each pixel output from the pixel unit in the case of being changed over to the first exposure mode by the exposure mode changeover unit.

This apparatus is capable of carrying out a simultaneous exposure of all pixels as in the global shutter system by controlling individual units, such as a shutter unit, according to the first exposure mode changed over by the exposure mode changeover unit.

A solid-state image pickup apparatus according to a third aspect of the present invention, in the aforementioned first aspect, wherein the control unit controls the pixel control unit, readout unit and shutter unit so as to have the shutter unit establish a state of a light incident to the pixel unit and reset, expose and read a signal of each pixel output from the pixel unit for each of the predetermined unit of pixels in the case of being changed over to the second exposure mode by the exposure mode changeover unit.

This apparatus is capable of carrying out an exposure by each of a predetermined unit of pixels as in the rolling shutter system by controlling individual units, such as a shutter unit, according to the second exposure mode changed over by the exposure mode changeover unit.

A solid-state image pickup apparatus according to a fourth aspect of the present invention, in the aforementioned first aspect, wherein the control unit further comprises a photographing mode changeover unit for changing over a photographing mode to either a first photographing mode for photographing a still image or a second photographing mode for photographing a moving image, and the exposure mode changeover unit changes over to the first exposure mode in the case of the photographing mode changeover unit changing over to the first photographing mode, or to the second exposure mode in the case of the photographing mode changeover unit changing over to the second photographing mode.

This apparatus is capable of changing over an exposure mode by the exposure mode changeover unit according to a photographing mode changed over by the photographing mode changeover unit.

A solid-state image pickup apparatus according to a fifth aspect of the present invention, in the aforementioned first aspect, wherein the exposure mode changeover unit changes over to the first exposure mode in the case of an exposure time which is obtained by according to a brightness of an object exceeding a predefined length of time, while changes over to the second exposure mode in the case of the exposure time not exceeding the predefined length of time.

This apparatus is capable of carrying out a changeover of an exposure mode by the exposure mode changeover unit according to an exposure time obtained based on a brightness of an object.

Note that the present invention may be configured as a control method for a solid-state image pickup apparatus, in addition to a solid-state image pickup apparatus per se.

BRIEF DESCRIPTION OF THE DRAWINGS

FIG. 5 is a diagram showing a packaging structure of an image pickup element chip and of a liquid crystal shutter which are comprised by a solid-state image pickup apparatus according to an embodiment 1;

FIG. 6 is a diagram showing a circuit configuration of an image pickup element chip packaging a liquid crystal shutter according to the embodiment 1;

DESCRIPTION OF THE PREFERRED EMBODIMENTS

The following is a detailed description of the preferred embodiment of the present invention by referring to the accompanying drawings.

Embodiment 1

FIG. 5 is a diagram showing a packaging structure of an image pickup element chip and of a liquid crystal shutter which are comprised by a solid-state image pickup apparatus according to an embodiment 1.

As shown in FIG. 5, the solid-state image pickup apparatus according to the present embodiment is configured to package by fixing a liquid crystal shutter 2 onto an image pickup element chip 1 by using a conductive adhesive 3. It is also possible to package the liquid crystal shutter 2 onto the image pickup element chip 1 by a junction of a solder bump allowing a process at a low temperature causing no influence of the liquid crystal shutter 2, although the present embodiment is configured to fix it by the conductive adhesive 3.

The image pickup element chip 1 is an LSI (large scale integrated circuit) of a silicone substrate, equipped with a CMOS image sensor (i.e., a CMOS solid-state image pickup element) constituted by a 4Tr type pixel circuit, a readout circuit and a control circuit for controlling the liquid crystal shutter 2, et cetera.

The liquid crystal shutter 2 is a transparent type liquid crystal shutter and is a shutter unit for establishing the state of a light (i.e., an image light) incident to a pixel unit of the CMOS image sensor or the state of shielding the pixel unit from the light by being controlled to be transparent or opaque, respectively, under the control of the control circuit equipped on the image pickup element chip 1.

FIG. 6 is a diagram showing a circuit configuration of the image pickup element chip 1 packaging the liquid crystal shutter 2.

Figure 1:
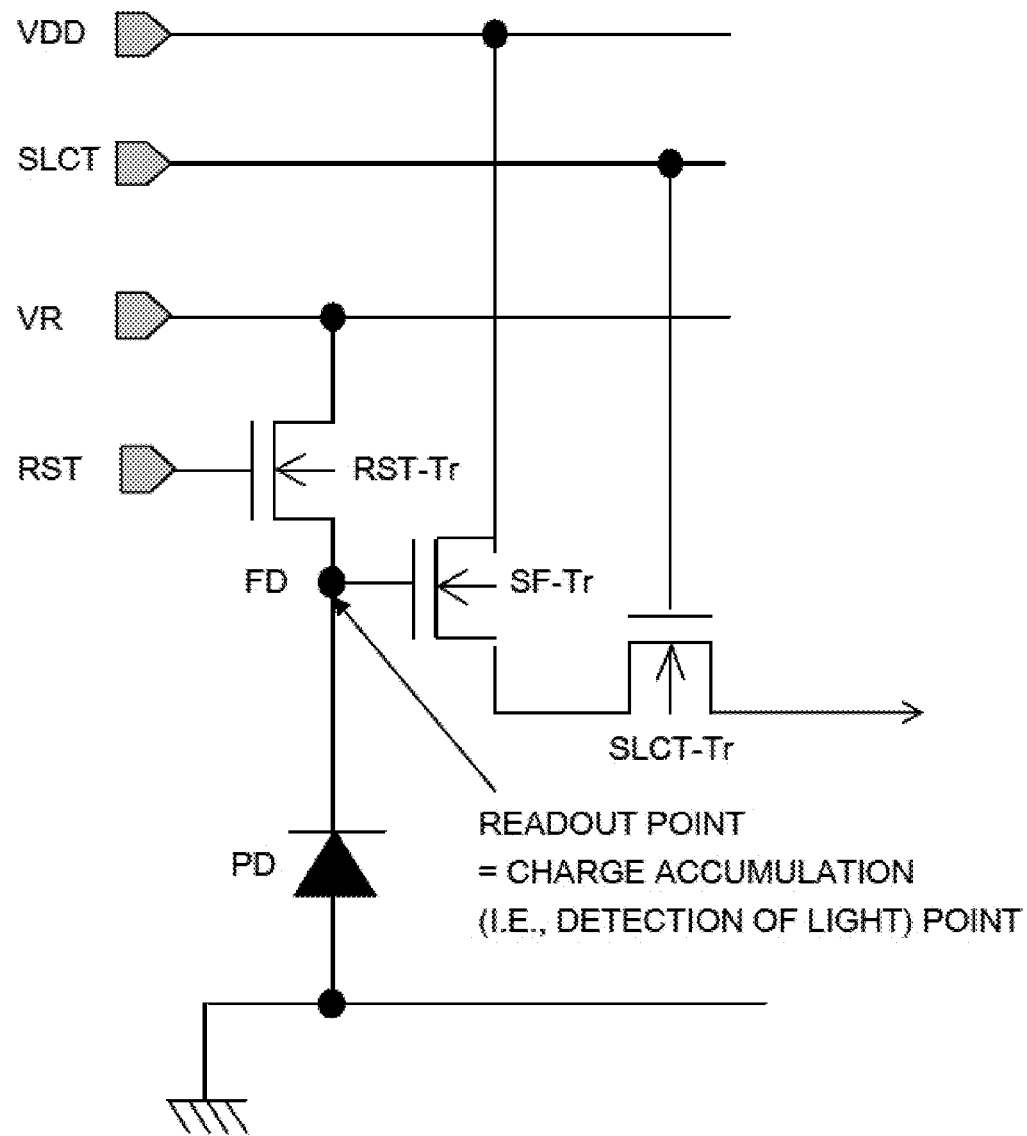
FIG. 1 is a diagram exemplifying a 3Tr type pixel circuit which is a pixel circuit, for one pixel, of a CMOS image sensor adopting a rolling shutter system.
Figure 2:
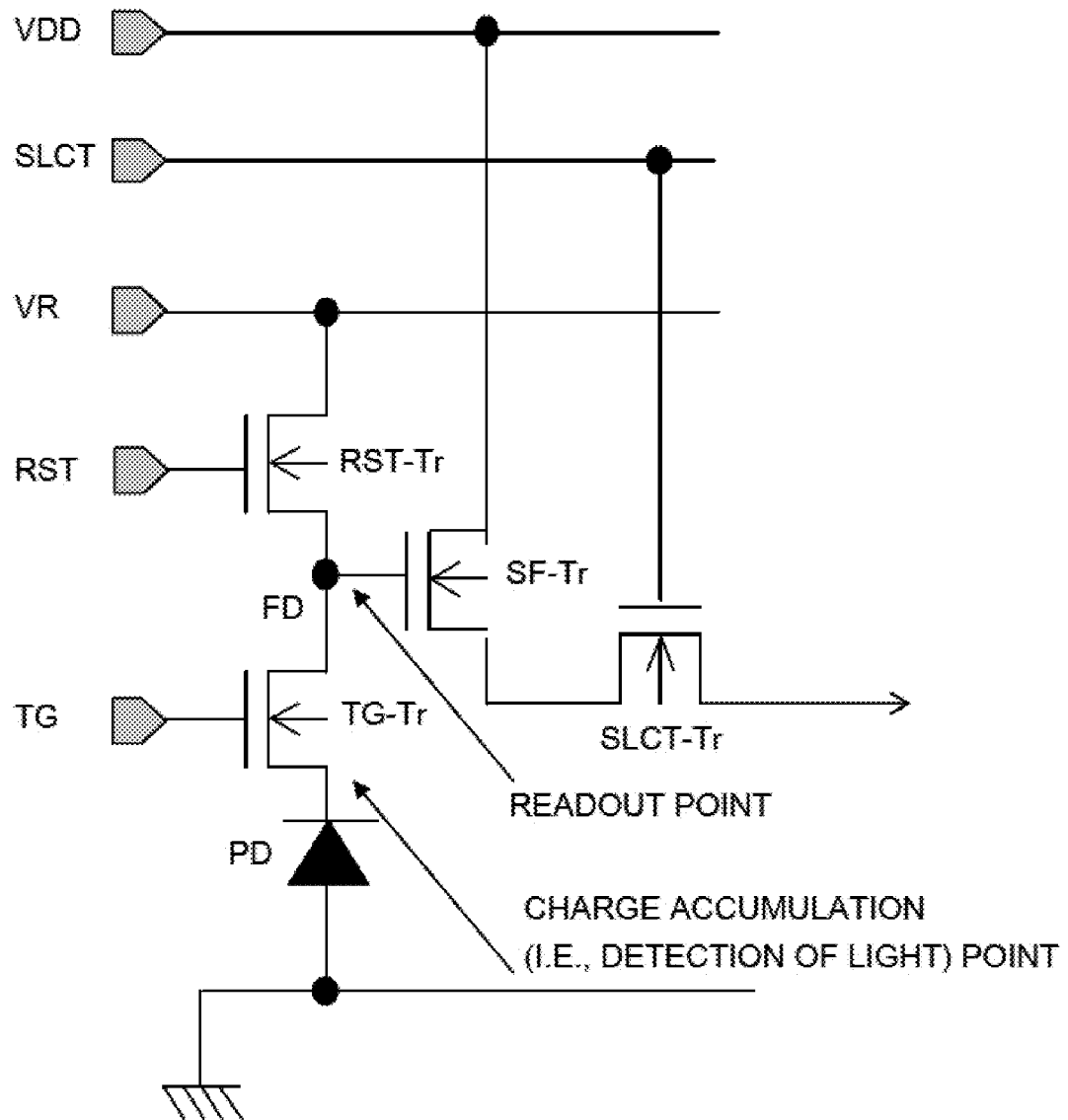
FIG. 2 is a diagram exemplifying a 4Tr type pixel circuit which is a pixel circuit, for one pixel, of a CMOS image sensor adopting a rolling shutter system.

Referring to FIG. 6, the pixel unit 4 is constituted by a plurality of pixels consisting of rows by columns, and a pixel circuit of each pixel is constituted by the 4Tr type pixel circuit as shown in the frame 5. Note that the pixel circuit shown in the frame 5 is the same as the one shown in FIG. 2. A line control circuit (as an example of a pixel control unit) 6 controls each pixel circuit of the pixel unit 4 by each line. The readout circuit (as an example of a readout unit) 7 reads out a signal of each pixel output from each column of the pixel unit 4. Also, the readout circuit 7 includes a CDS circuit and outputs a differential signal as a result of subtracting a signal read out at the time of a reset from one read out at the time of a charge generated by an exposure existing in the FD. An analog-to-digital converter (ADC) 8 converts an analog signal which is an output of the readout circuit 7 into a digital signal, and outputs it. A drive circuit 9 drives the liquid crystal shutter 2.

A control circuit (as an example of a control unit) 10 comprises a GS/LS changeover unit (as an example of an exposure mode changeover unit) 10a for changing over a shutter mode to a global shutter mode (called "GS mode" hereinafter) or a rolling shutter mode (called "LS mode" hereinafter), and controls each circuit of the line control circuit 6, readout circuit 7, ADC 8 and drive circuit 9 according to the shutter mode changed over by the GS/LS changeover unit 10a.

Note that the configuration is such that a simultaneous exposure is performed for all pixels of the pixel unit 4 when a shutter mode is the GS mode, while an exposure for each line of the pixel unit 4 is performed when the shutter mode is the LS mode, which is described in detail later.

The control circuit 10 also comprises an exposure time control unit (not shown herein) for controlling an exposure time length according to an exposure time obtained by an automatic exposure (AE) function comprises by the present solid-state image pickup apparatus. Note the exposure time obtained by the AE function is obtained by according to a brightness of an object e. The next description in detail is of an operation, as that of the circuit configuration shown in FIG. 6, in the case of the shutter mode changed over by the GS/LS changeover unit 10a being the GS mode and the case of the LS mode.

The first description is of an operation in the case of the changed over shutter mode being the GS mode. In this case, each circuit of the line control circuit 6, readout circuit 7, ADC 8 and drive circuit 9 are controlled according to the changed over GS mode.

Figure 7:
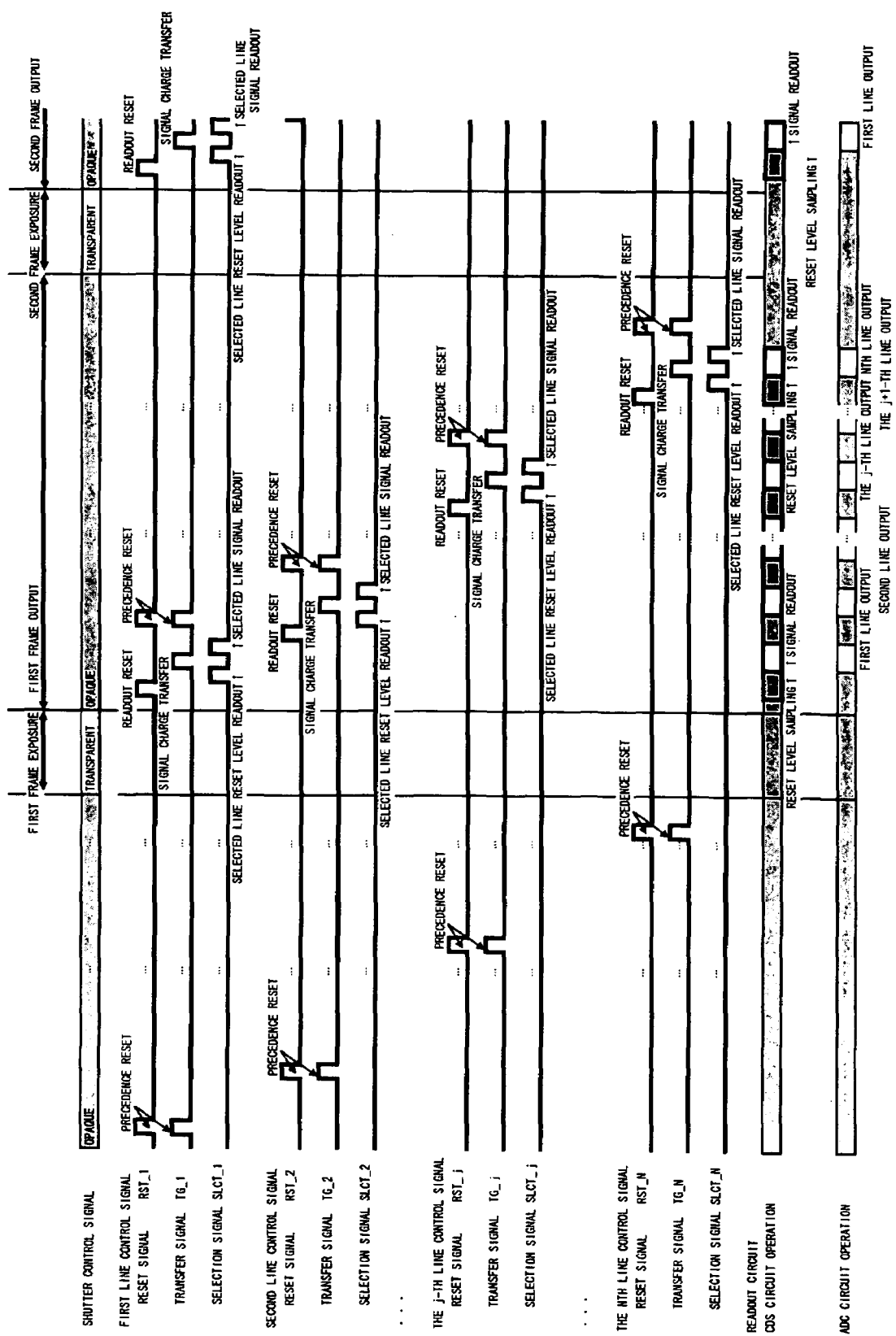
FIG. 7 is a timing chart showing an operation in the case of a shutter mode being a GS mode according to the embodiment 1.

FIG. 7 is a timing chart showing an operation in the case of a shutter mode being a GS mode.

Referring to FIG. 7, "shutter control signal" is a signal output from the control circuit 10 to the drive circuit 9 for controlling the liquid crystal shutter 2. Note that the drive circuit 9 drives so as to make the liquid crystal shutter 2 transparent or opaque according to the shutter control signal.

Each of the control signals, i.e., "the first line control signal", "the second line control signal", through "the j-th line control signal", through "the Nth line control signal", is a signal output from the line control circuit 6 to the pixel circuit of a pixel of each line of the pixel unit 4 under the control of the control circuit 10. Each of these signals comprises a "reset signal" (i.e., RST) which is one for controlling the RST-Tr, a "transfer signal" (i.e., TG) which is one for controlling the TG-Tr, and a "selection signal" (i.e., SLCT) which is one for controlling the SLCT-Tr in the pixel circuit (refer to the frame 5 shown in FIG. 6).

And "readout circuit CDS circuit operation" is an operation of the readout circuit 7 including a CDS circuit. And "ADC circuit operation" is an operation of the ADC 8.

As shown in the timing chart of FIG. 7, an operation in the case of the shutter mode being the GS mode, first:

(Step S1) makes the liquid crystal shutter 2 opaque according to a shutter control signal and shields the pixel unit 4 from a light.

(S2) it subsequently perform the operation of the following step S2a in the pixel circuit of each pixel of each line for each line in sequence starting from the first line of the pixel unit 4 according to a control signal from the line control circuit 6.

(S2a) simultaneously turns the reset signal and transfer signal ON and OFF, respectively, to turn ON the RST-Tr and TG-Tr simultaneously to reset the PD (i.e., a precedence reset). Subsequently:

(S3) makes the liquid crystal shutter 2 transparent according to a shutter control signal. This makes a light (i.e., an imaging light) incident to all the pixels of the pixel unit 4, thereby performing a simultaneous exposure of all the pixels (i.e., an exposure for one frame), in which event a charge is generated by the light radiation in the PD of each pixel circuit of the pixel unit 4.

Note that the time for keeping the liquid crystal shutter 2 transparent, that is, the exposure time length, is determined by the exposure time obtained by the AE function comprised by the present solid-state image pickup apparatus. Then:

(S4) makes the liquid crystal shutter 2 opaque again according to a shutter control signal to shield the pixel unit 4 from a light. Then:

(S5) carries out the following operations in the steps S5a through S5d sequentially in the pixel circuit of each pixel on each line for each line in sequence starting from the first line of the pixel unit 4 according to a control signal from the line control circuit 6, also operates the readout circuit 7 in the step S5b, and operates the readout circuit 7 and ADC 8 in the step S5d (i.e., an output operation for one frame).

(S5a) turns a reset signal ON then OFF to turn ON the RST-Tr and resets the FD (i.e., a readout reset).

(S5b) turns a selection signal ON then OFF to turn ON the SLCT-Tr and makes the SF-Tr output a signal at the time of a reset (i.e., a reset level readout). The presently output signal at the time of a reset is read out by the readout circuit 7 (i.e., a reset level sampling).

(S5c) turns a transfer signal ON then OFF to turn ON the TG-Tr to transfer a charge accumulated in the PD to the FD (i.e., a signal charge transfer).

(S5d) turns a selection signal ON then OFF to turn ON the SLCT-Tr and makes the SF-Tr output a signal at the time of transferring a charge accumulated in the PD to the FD. The presently output signal is read out by the readout circuit 7 (i.e., a signal readout), is subtracted by the signal at the time of a reset which is read out in the above described step S5b for each column by the CDS circuit of the readout circuit 7, and the resultant differential signal is output. This makes it possible to cancel a reset noise (i.e., a kTC noise), that is, a signal level at the time of a reset is slightly different at each time, and simultaneously a noise due to an element variation of the SF-Tr for each column. Then, the differential signal output from the readout circuit (i.e., the CDS circuit) 7 is output after being converted to a digital signal by the ADC 8.

Note that, in the case of an operation of the GS mode being performed for photographing a moving image, the operation in the step S5d turns ON the SLCT-Tr, followed further by turning ON the RST-Tr and TG-Tr simultaneously to reset the PD (i.e., a precedence reset) in the same manner as the above described step S2a, as shown in the timing chart of FIG. 7.

Likewise, an exposure and output for one frame is repeated in the subsequent step. Comparably, in the case of an operation of the GS mode being performed for photographing a still image, the operation thereof ends upon completion of the above described operation in the step S5.

The next description is of an operation in the case of a changed over shutter mode being the LS mode. In this case, each circuit of the line control circuit 6, readout circuit 7, ADC 8 and drive circuit 9 is controlled according to the changed over LS mode.

Figure 8:
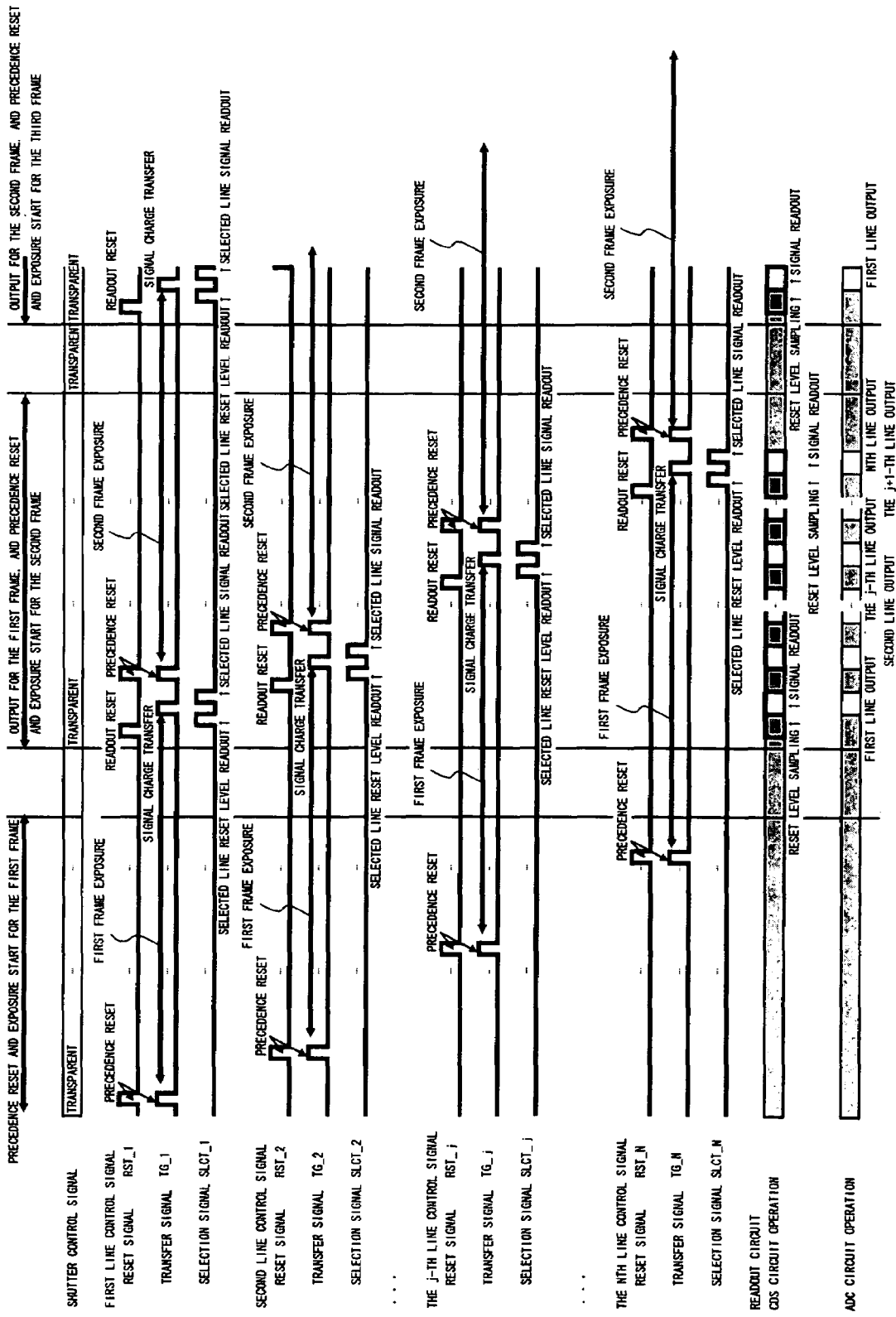
FIG. 8 is a timing chart showing an operation in the case of a shutter mode being an LS mode according to the embodiment 1.

FIG. 8 is a timing chart showing an operation in the case of a shutter mode being the LS mode.

As shown in the timing chart of FIG. 8, an operation in the case of the shutter mode being the LS mode, (S11) makes the liquid crystal shutter 2 transparent according to a shutter control signal so that a light (i.e., an image light) incident to all the pixels of the pixel unit 4. Subsequently:

(S12) performs the operation of the next step S12a in the pixel circuit of each pixel on each line for each line in sequence starting from the first line of the pixel unit 4 according to a control signal from the line control circuit 6 (i.e., a precedence reset and exposure start for one frame).

(S12a) turns a reset signal and a transfer signal ON then OFF to turn ON the RST-Tr and TG-Tr simultaneously to reset the PD (i.e., a precedence reset) and starts an exposure for the pixels of the present line. Then:

(S13) performs operations in the following steps S13a through S13d in the pixel circuit of each pixel on each line for each line in sequence starting from the first line of the pixel unit 4 according to a control signal from the line control circuit 6, also operates the readout circuit 7 in the step S13b and operates the readout circuit 7 and ADC 8 in the step S13d (i.e., an output operation for one frame).

(S13a) turns a reset signal ON then OFF to turn ON the RST-Tr and resets the FD (i.e., a readout reset).

(S13b) turns a selection signal ON then OFF to turn ON the SLCT-Tr and outputs a signal at the time of a reset from the SF-Tr (i.e., a reset level readout). The presently output signal at the time of a reset is read out by the readout circuit 7 (i.e., a reset level sampling).

(S13c) turns a transfer signal ON then OFF to turn ON the TG-Tr and transfers a charge accumulated in the PD to the FD (i.e., a signal charge transfer).

Note that the time from the end of the precedent reset in the step S12a until the TG-Tr turning ON in the above described step S13c is the exposure time in each pixel circuit on the same line of the pixel unit 4. The exposure time is determined according to the exposure time obtained by an automatic exposure (AE) function comprised by the present solid-state image pickup apparatus.

(S13d) turns a selection signal ON then OFF to turn ON the SLCT-Tr and output a signal, from the SF-Tr, of the time of transferring a charge accumulated in the PD to the FD. The presently output signal is read out by the readout circuit 7 (i.e., a signal readout), is subtracted, by the CDS circuit of the readout circuit 7, by a signal at the time of a reset which is read out in the above described step S13b for each column, and the resultant difference signal is output. This makes it possible to cancel a reset noise (i.e., a kTC noise) of which a signal level at the time of a reset is slightly different in each time and a noise due to an element variation of the SF-Tr for each column in the same manner as the operation at the time of the above described GS mode. Then, the differential signal output from the readout circuit (i.e., the CDS circuit) 7 is output after being converted into a digital signal by the ADC 8.

Note that, in the case of the operation of the LS mode being performed for photographing a moving image, the SLCT-Tr is turned ON, further followed by turning ON the RST-Tr and TG-Tr simultaneously to reset the PD (i.e., a precedence reset) and staring an exposure for the pixels on the present line (i.e., a precedence reset and exposure start for the next one frame) in the same manner as in the step S12a as shown by the timing chart of FIG. 8 in the operation of the above described step S13d. Likewise, an output for one frame followed by a precedence reset and exposure start for next one frame are repeated thereafter. Contrarily, in the case of the operation of the LS mode being performed for photographing a still image, the operation of the LS mode ends upon completion of the operation in the above described step S13.

As described above, the solid state image pickup apparatus according to the present embodiment is configured to accomplish the GS function enabling a simultaneous all pixel exposure of the pixel unit 4 by the liquid crystal shutter 2 packaged onto the GS image pickup element chip 1, and enable a changeover for either a simultaneous all pixel exposure by the GS mode or exposure for each line by the LS mode by a changeover of the shutter mode. This configuration makes it possible to change over the shutter modes according to a user instruction for instance, in which case the user is enabled to select a shutter mode according to his preference.

Also, the solid state image pickup apparatus according to the present embodiment is configured to use the 4Tr type pixel circuit as a pixel circuit of each pixel, thereby enabling a structure of burying the PD in the inside of a Silicon substrate (i.e., within the image pickup element chip 1) and accordingly minimizing an influence of a dark-current noise caused by a crystallization defect, a large number of which exists on the Silicon surface. Also enabled is a cancellation of a kTC noise by the CDS circuit, thereby accomplishing a solid-state image pickup element with a low noise, high SN ratio.

Note that it is also possible to use a 3Tr type pixel circuit or 4Tr-Tr common use pixel circuit, although the solid state image pickup apparatus according to the present embodiment is configured to use the 4Tr type pixel circuit as a pixel circuit. In the case of using a 3Tr type pixel circuit for instance, a simultaneous all pixel exposure is enabled by resetting it by making the liquid crystal shutter 2 opaque, followed by performing an exposure by making the liquid crystal shutter 2 transparent and reading out by making it opaque again for one frame.

Figure 9:
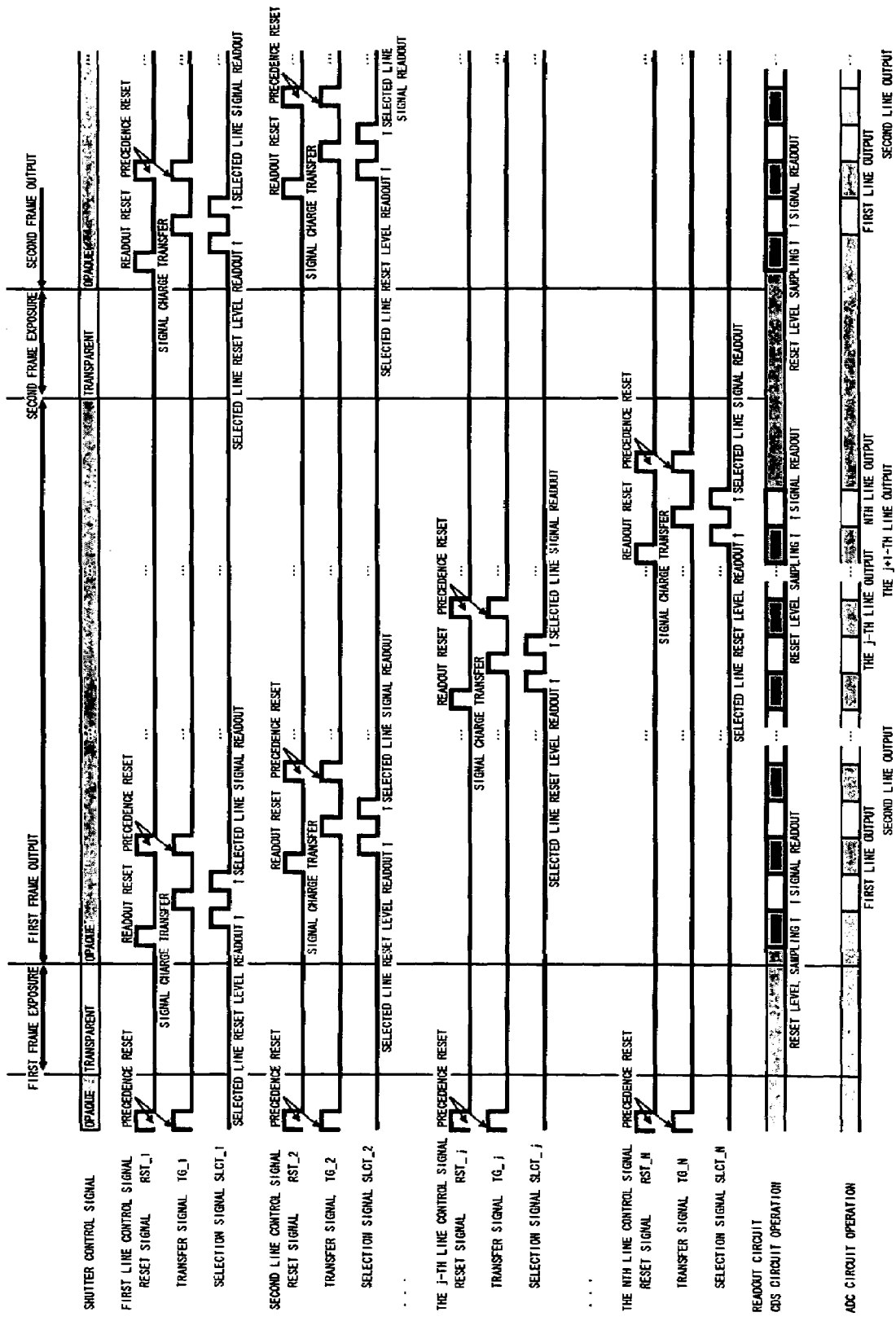
FIG. 9 is a timing chart showing an operation in the case of a shutter mode being a GS mode according to a modification of the embodiment 1.

Meanwhile, the solid state image pickup apparatus according to the present embodiment has been described by the operation in the case of a shutter mode being the GS mode by referring to the timing chart shown in FIG. 7, in which the operation of the above described step S2 that is first performed in the timing chart is configured to carry out the operation of the above described step S2a at the pixel circuit of each pixel on each line sequentially for each line starting from the first line of the pixel unit 4; it is, however, possible to configure so as to carry out the operation of the above described step S2a at the pixel circuit of each pixel on each line simultaneously for all lines of the pixel unit 4 as the timing chart shown in FIG. 9. This configuration makes it possible to perform a precedence reset which is first performed for the pixel circuits of all pixels of the pixel unit 4 in a short time, enabling a further improvement of a frame rate.

Embodiment 2

A solid-state image pickup apparatus according to an embodiment 2 of the present invention is an aspect of changing over shutter modes according to a photographing mode.

In the solid-state image pickup apparatus according to the present embodiment, the packaging structure of an image pickup element chip and of a liquid crystal shutter which are comprised by the aforementioned apparatus is the same as the embodiment 1, and therefore a description is omitted here.

Figure 10:
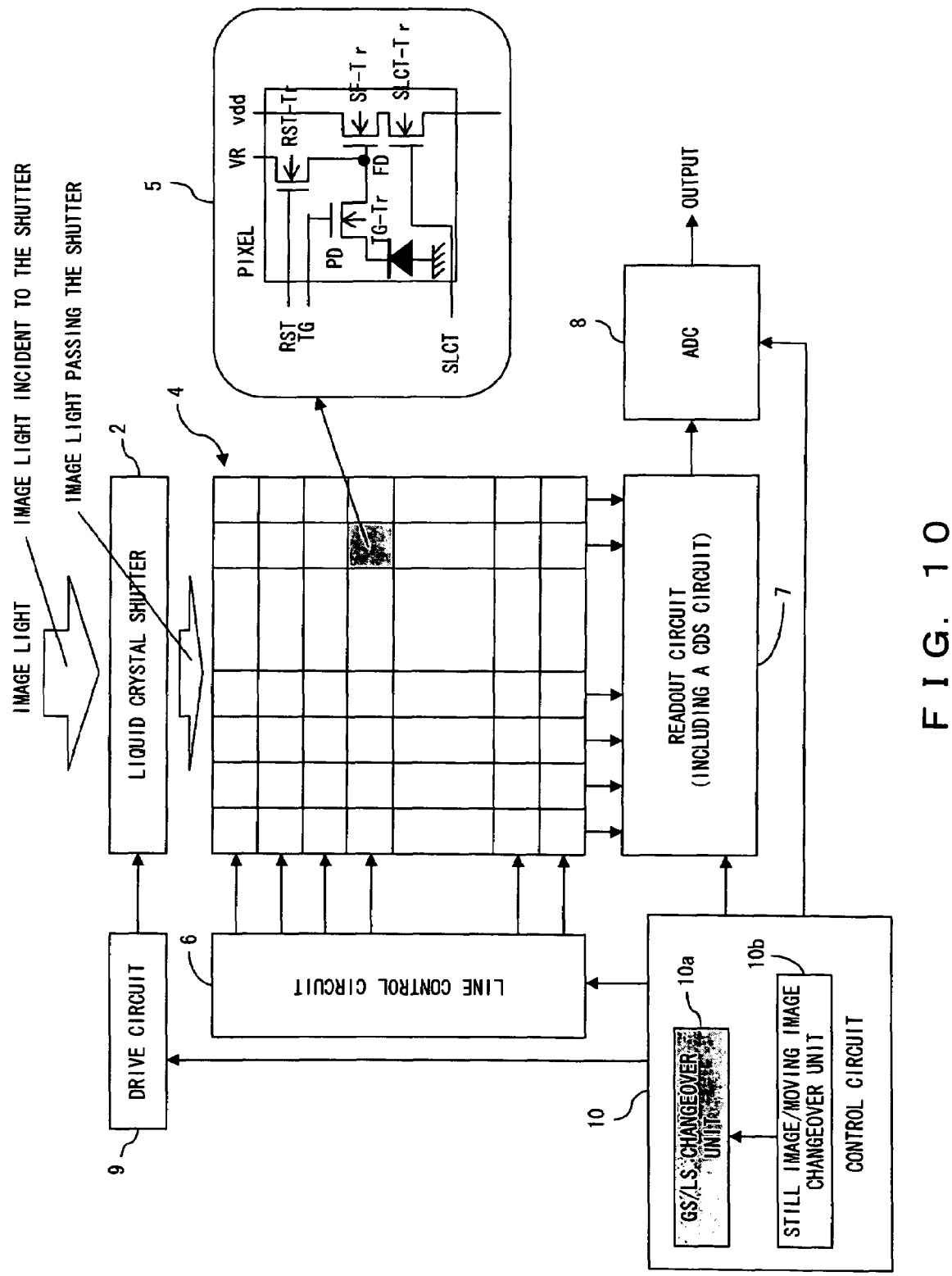
FIG. 10 is a diagram showing a circuit configuration of an image pickup element chip packaging a liquid crystal shutter according to the embodiment 2.

FIG. 10 is a diagram showing a circuit configuration of an image pickup element chip packaging a liquid crystal shutter in the solid state image pickup apparatus according to the present embodiment. Incidentally in the showing of FIG. 10, the same element as one shown in FIG. 6 is assigned the same component sign and a description thereof is omitted here.

The circuit configuration shown in FIG. 10 differs from the one shown in FIG. 6 where the control circuit 10 further comprises a still image/moving image changeover unit (as an example of a photographing mode changeover unit) 10b for change over a photographing mode to a still image mode for photographing a still image or moving image mode for photographing a moving image, in which a GS/LS changeover unit 10a changes over a shutter mode according to a photographing mode changed over by the still image/moving image changeover unit 10b. The present embodiment is configured in a manner that the GS/LS changeover unit 10a changes over a shutter mode to the GS mode if a photographing mode changed over by the still image/moving image changeover unit 10b is the still image mode, while changes it over to the LS mode if the photographing mode is the moving image mode.

The reason for thusly changing over is that the GS mode and LS mode have the following characteristics. That is, the GS mode has a longer time period between an exposure and the next because it cannot perform an exposure for the next frame until the readouts of individual pixels of the pixel unit 4 are all completed, hence decreasing a frame rate as compared to the LS mode; the GS mode, however, has a characteristic of not causing a distortion in an image as all the pixels are simultaneously put under exposure, whereas the LS mode possibly causes a distortion in an image because an exposure is performed by line; the LS mode, however, has a characteristic of a higher frame rate as compared to the GS mode.

The next description is of operations in the cases of a photographing mode changed over by the still image/moving image changeover unit 10b being the still image mode and moving image mode, as the operations of the circuit configuration shown in FIG. 10.

The first description is of the case of a photographing mode changed over by the still image/moving image changeover unit 10b being the still image mode. In this case, a shutter mode is changed over to the GS mode by the GS/LS changeover unit 10a corresponding to the photographing mode being changed over to the still image mode, and individual circuits of the line control circuit 6, readout circuit 7, ADC 8 and drive circuit 9 are controlled according to the GS mode.

Incidentally, an operation for photographing a still image in the GS mode is the same as the description by using the timing chart shown in FIG. 7 (or FIG. 9), and therefore a description is omitted here.

Comparably, in the case of a photographing mode changed over by the still image/moving image changeover unit 10b being the moving image mode, a shutter mode is changed over to the LS mode by the GS/LS changeover unit 10a corresponding to the photographing mode being changed over to the moving image mode, and individual circuits of the line control circuit 6, readout circuit 7, ADC 8 and drive circuit 9 are controlled according to the LS mode.

Incidentally, an operation for photographing a moving image in the LS mode is the same as the description by using the timing chart shown in FIG. 8, and therefore a description is omitted here.

As described above, the solid state image pickup apparatus according the present embodiment is configured to change over a shutter mode according to a photographing mode, thereby making it possible to change over a shutter mode automatically to a suitable mode for the photographing mode.

In the case of applying, to a portable phone, the solid state image pickup apparatus according to the present embodiment, for example, a configuration may be in a manner to change over a photographing mode to the moving image mode, photographing a moving image and display the moving image in a display unit if there is no instruction for photographing a still image, while change over a photographing mode to the still image mode and photograph a still image only when there is an instruction for photographing a still image in a camera mode capable of photographing. This configuration makes a smooth motion of a moving image to be displayed in a display unit when a user does not issue an instruction for photographing a still image, and makes it possible to photograph a distortion-free still image when the user has issued an instruction for photographing a still image, in the camera mode.

Embodiment 3

A solid-state image pickup apparatus according to an embodiment 3 of the present invention is an aspect of changing over shutter modes according to an exposure time obtained by an AE function comprised by the aforementioned apparatus.

In the solid-state image pickup apparatus according to the present embodiment, the packaging structure of an image pickup element chip and of a liquid crystal shutter which are comprised by the aforementioned apparatus is the same as the embodiment 1, and therefore a description is omitted here.

Figure 11:
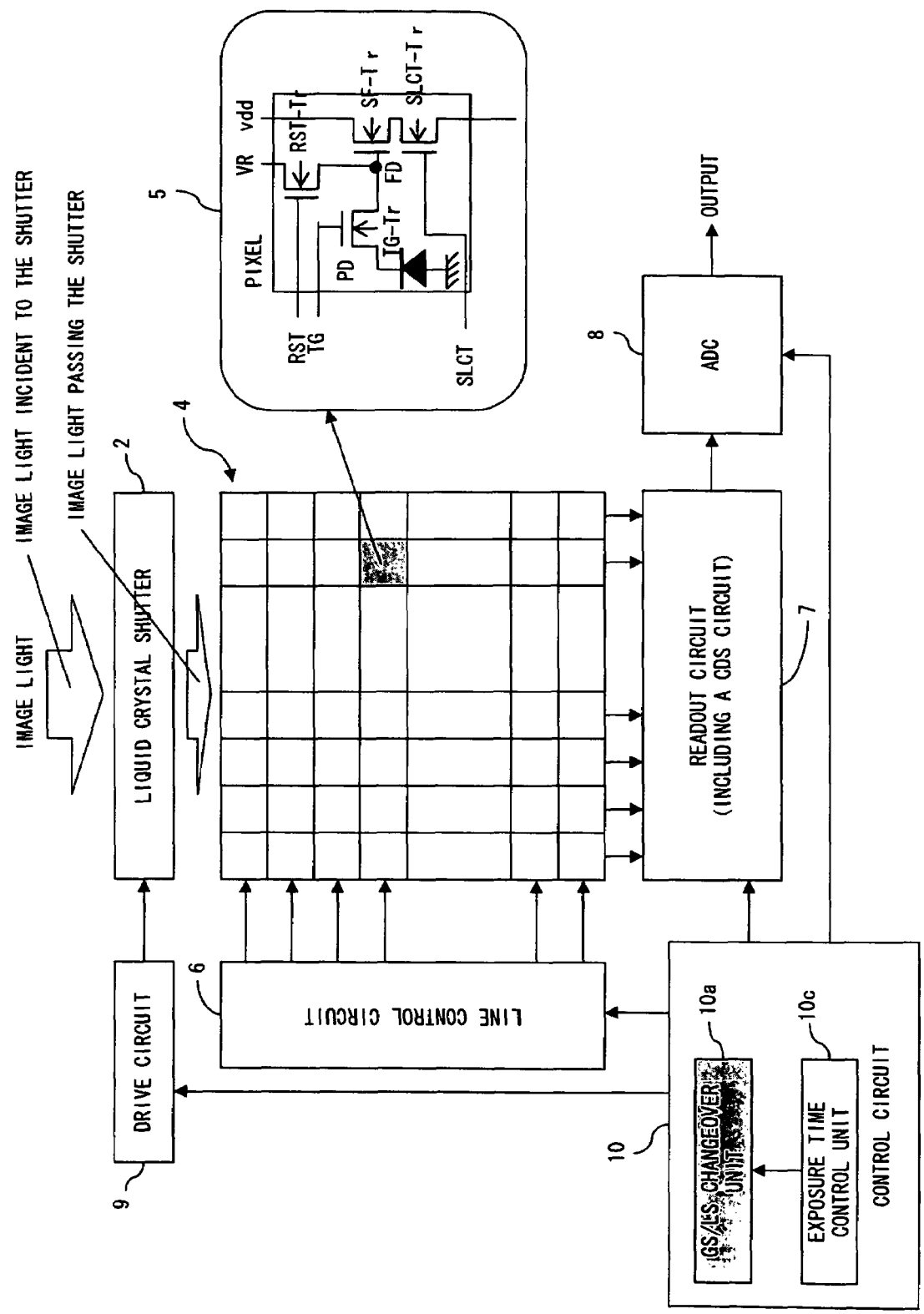
FIG. 11 is a diagram showing a circuit configuration of an image pickup element chip packaging a liquid crystal shutter according to the embodiment 3.

FIG. 11 is a diagram showing a circuit configuration of an image pickup element chip packaging a liquid crystal shutter in a solid-state image pickup apparatus according to the present embodiment. Incidentally in the showing of FIG. 11, the same element as one shown in FIG. 6 is assigned the same component sign and a description thereof is omitted here.

The circuit configuration shown in FIG. 11 differs from the one shown in FIG. 6 where the GS/LS changeover unit 10a changes over shutter modes according to a control signal from an exposure time control unit 10c controlling an exposure time length. The present embodiment is configured in such a manner that the exposure time control unit 10c controls so as to make an exposure time be one obtained by the AE function comprised by the present solid state image pickup apparatus, and also outputs a control signal to the GS/LS changeover unit 10a for changing over to the GS mode if an exposure time obtained by the AE function exceeds a predefined time, while outputs a control signal to the GS/LS changeover unit 10a for changing over to the LS mode if the exposure time obtained by the AE function is equal to or less than a predefined time. This configuration changes over to the GS mode if an exposure time obtained by the AE function exceeds a predefined time, while changes over to the LS mode if the exposure time obtained by the AE function is equal to or less than a predefined time.

The reason for changing over as such is that an AE function generally controls so as to lengthen an exposure time for a dark object, while shorten the exposure time for a bright object in order to make the brightness of an image appropriate. Due to this, although when an exposure time obtained by the AE function is short, a distortion in an image is not apparent, it becomes apparent when the exposure time is long, and the reason is for preventing such a problem.

The next description is of an operation in the cases of the exposure time control unit 10c outputting a control signal to the GS/LS changeover unit 10a for changing over to the GS mode, and outputting a control signal thereto for changing over to the LS mode, according to an exposure time obtained by the AE function exceeding a predefined time or not.

The first description is of an operation in the case of the exposure time control unit 10c outputting a control signal to the GS/LS changeover unit 10a for changing over to the GS mode because of an exposure time obtained by the AE function exceeding a predefined time. In this case, a shutter mode is changed over to the GS mode by the GS/LS changeover unit 10a according to the control signal for changing over to the GS mode, and individual circuits of the line control circuit 6, readout circuit 7, ADC 8 and drive circuit 9 are controlled according to the GS mode.

Incidentally, an operation in the GS mode is the same as the description by using the timing chart shown in FIG. 7 (or FIG. 9), and therefore a description is omitted here.

Contrarily, in the case of the exposure time control unit 10c outputting a control signal to the GS/LS changeover unit 10a for changing over to the LS mode because of an exposure time obtained by the AE function being equal to or less than a predefined time, a shutter mode is changed over to the LS mode by the GS/LS changeover unit 10a according to a control signal for changing over to the LS mode, and individual circuits of the line control circuit 6, readout circuit 7, ADC 8 and drive circuit 9 are controlled according to the LS mode.

Incidentally, an operation in the LS mode is the same as the description by using the timing chart shown in FIG. 8, and therefore a description is omitted here.

As described above, the solid state image pickup apparatus according to the present embodiment is configured to change over a shutter mode according to an exposure time obtained by the AE function, thereby making it possible to obtain a distortion-free image as a result of changing over to the GS mode in the case of the exposure time being long because the object is dark and also an image without an apparent distortion as a result of changing over to the LS mode in the case of the exposure time being short because the object is bright. Meanwhile, it is possible to accomplish a relatively high frame rate by changing over to the LS mode in the case of a short exposure time due to a bright object for photographing a moving image.

Embodiment 4

A solid-state image pickup apparatus according to an embodiment 4 of the present invention is an aspect of applying a 4Tr-Tr common use pixel circuit as a pixel circuit of the pixel unit 4 used for the solid-state image pickup apparatus according to the embodiment 3.

In the solid-state image pickup apparatus according to the present embodiment, the packaging structure of an image pickup element chip and of a liquid crystal shutter which are comprised by the aforementioned apparatus is the same as the embodiment 1, and therefore a description is omitted here.

Figure 12:
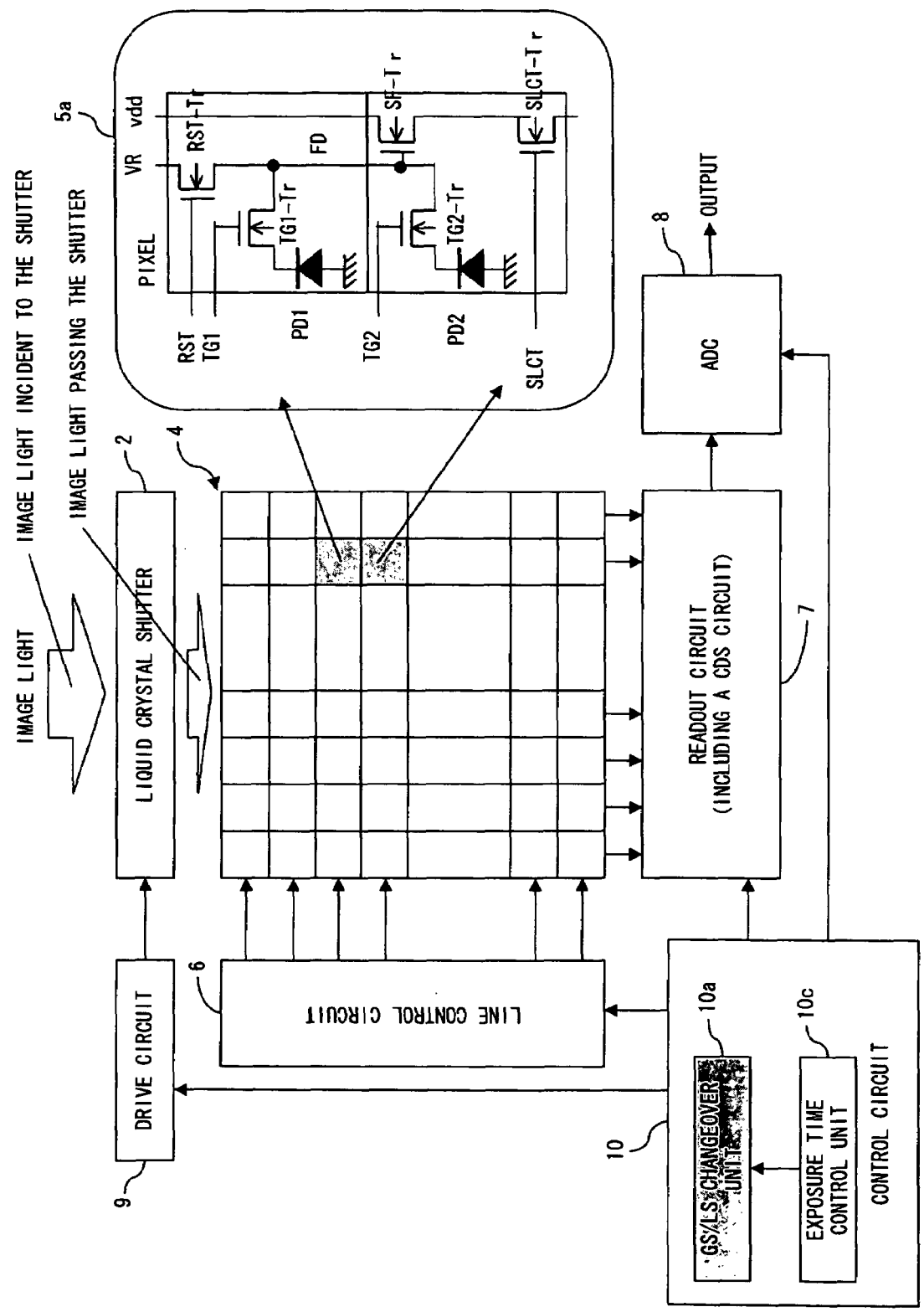
FIG. 12 is a diagram showing a circuit configuration of an image pickup element chip packaging a liquid crystal shutter according to the embodiment 4.

FIG. 12 is a diagram showing a circuit configuration of an image pickup element chip packaging a liquid crystal shutter in the solid state image pickup apparatus according to the present embodiment. Incidentally in the showing of FIG. 12, the same element as one shown in FIG. 11 is assigned the same component sign and a description thereof is omitted here.

Figure 3:
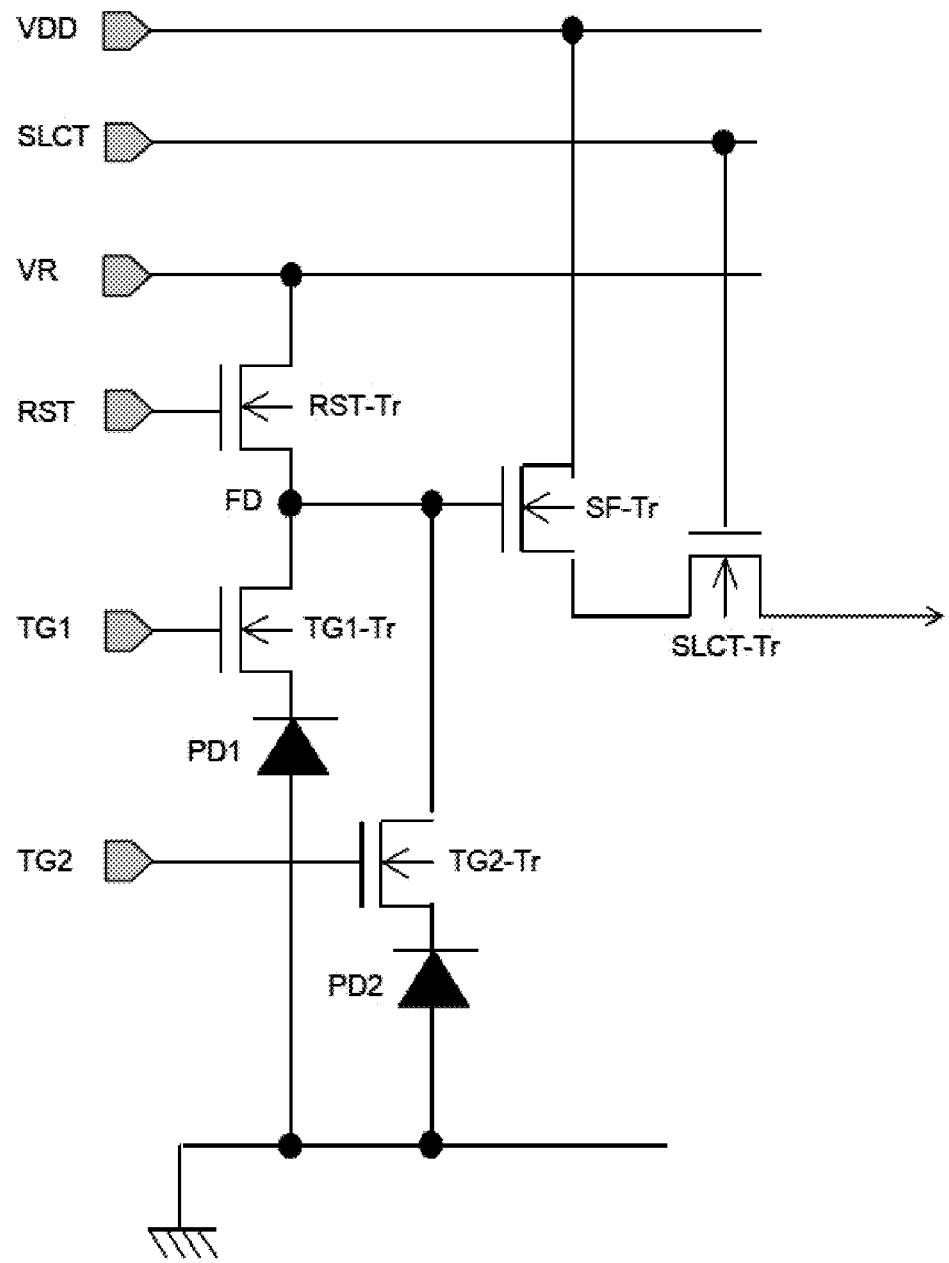
FIG. 3 is a diagram exemplifying a 4Tr-Tr common use type pixel circuit which is a pixel circuit, for two pixels, of a CMOS image sensor adopting a rolling shutter system.
Figure 4:
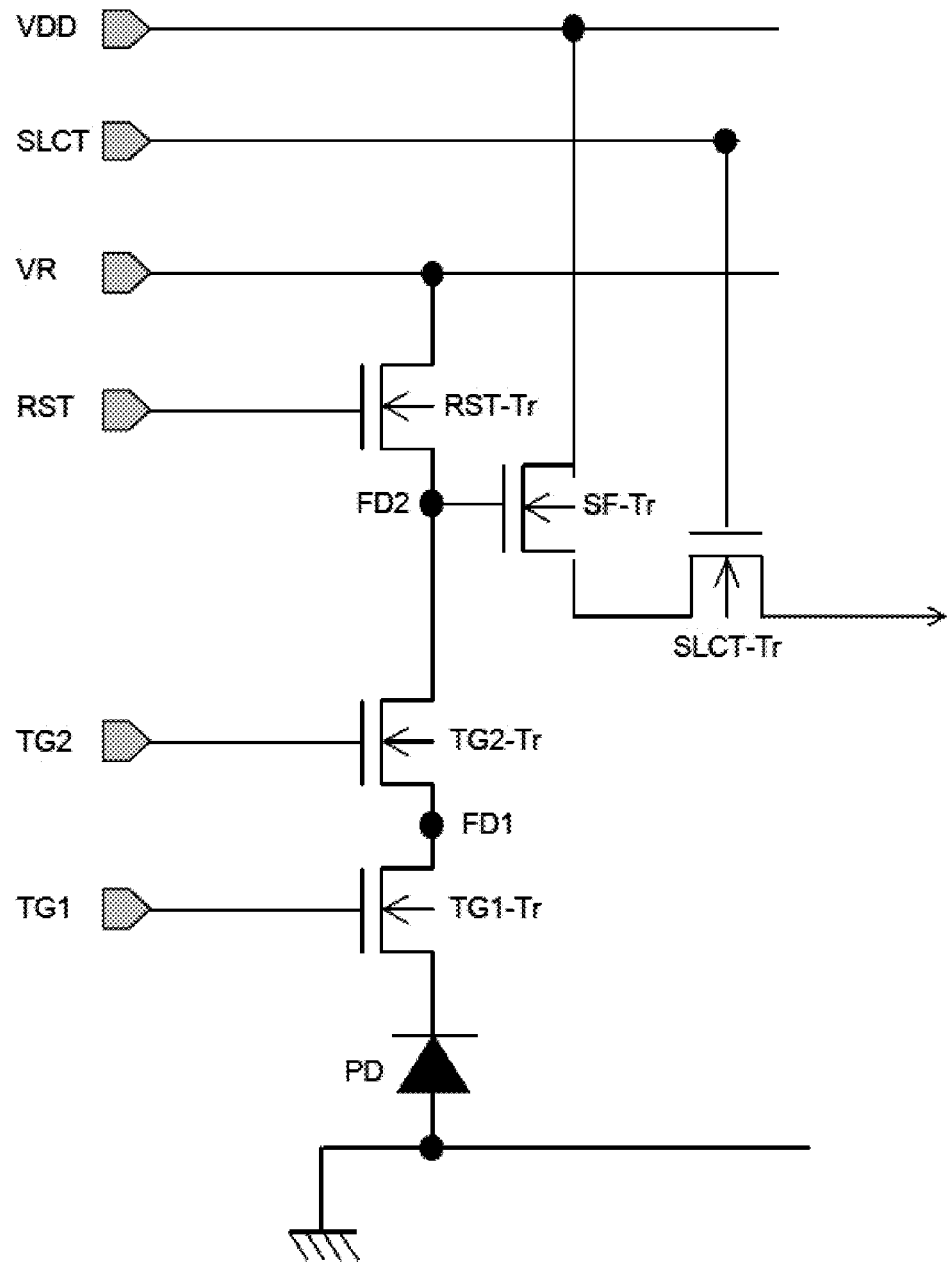
FIG. 4 is a diagram exemplifying a 5Tr type pixel circuit which is a pixel circuit, for one pixel, of a CMOS image sensor adopting a global shutter system.

The circuit configuration shown in FIG. 12 differs from the one shown in FIG. 11 where the pixel circuit for each two pixels is constituted by a 4Tr-Tr common use type as shown in the frame 5a of FIG. 12. That is, the circuit configuration shown in FIG. 12 is constituted by the 4Tr-Tr common use type sharing the RST-Tr, SF-Tr and SLCT-Tr by each two pixels (i.e., two pixels of two lines by one column) as shown by the frame 5a in FIG. 12, as opposed to the pixel circuit of each pixel being constituted by the 4Tr type in the circuit configuration shown in FIG. 11 as shown by the frame 5 therein. Incidentally the pixel circuit shown by the frame 5a is the same as the one shown in FIG. 3.

Since there is one signal line for a reset signal, and there is the one for a selection signal, for two pixels commonly using the RST-Tr, SF-Tr and SLCT-Tr, the operation of the circuit configuration shown by FIG. 12 differs from that of the circuit configuration according to the embodiment 3 where a reset signal uses one signal line for the two lines sequentially and a selection signal uses one line for the two lines sequentially in the former, otherwise the same operation. Therefore a description is omitted here.

As described above, the solid-state image pickup apparatus according to the present embodiment is configured to apply the 4Tr-Tr common use type to the pixels circuit, thereby making it possible to enlarge the optical reception area size of the PD for the same pixel size as compared to the 4Tr type pixel circuit for instance and accordingly increase the sensitivity and saturation charge volume of the PD and an improvement of an S/N ratio. And for the same optical reception area size, a pixel size can be reduced, thus enabling an accomplishment of a miniaturization and a low cost of the circuit.

As such, while the embodiment 1 through 4 have been described, the solid-state image pickup apparatus according to each of these embodiments may be configured to apply a solid state image pickup element equipped with no GS function such as another MOS type image sensor and a Charge Modulation Device (CMD) in place of the CMOS image sensor.

While the solid-state image pickup apparatus according to each of these embodiments exemplifies the use of 4Tr type pixel circuit, already proposed is a system eliminating a selection-use transistor from a 4Tr type and instead storing a non-selection signal in an FD node. It is easily associable that the present invention has the same effect on such a 4Tr type pixel circuit eliminating a selection-use transistor.

Also, the solid-state image pickup apparatus according to each of the present embodiments may be configured in a manner to have an image pickup element chip further equipped with an image process circuit such as color processing, gamma processing, contour correction processing and Automatic White Balance (AWB) processing.

Also, the solid-state image pickup apparatus according to each of the present embodiments may be configured to apply a mechanical shutter in place of the liquid crystal shutter 2 if a moving image is not photographed in the GS mode.

While the present invention has been described in detail thus far, it is not limited to the above described preferred embodiments, and rather, the present invention may of course be variously improved and changed within the scope thereof.

As described above, the present invention is contrived to enable an accomplishment of a compact and low noise solid state image pickup apparatus equipped with a global shutter function.

What is claimed is:

1. A solid-state image pickup apparatus, comprising:
a pixel unit including a plurality of pixels;
a pixel control unit for controlling the plurality of pixels;
a readout unit for reading a signal of each pixel output from the pixel unit;
a shutter unit for establishing a state of a light incident to the pixel unit and that of shielding the pixel unit from the light; and
a control unit, comprising an exposure mode changeover unit for changing over an exposure mode to either a first exposure mode performing a simultaneous exposure for all pixels or a second exposure mode performing an exposure for each of a predetermined unit of pixels, for controlling the pixel control unit, readout unit and shutter unit according to an exposure mode changed over by the exposure mode changeover unit, wherein
the pixel unit is one in which each pixel comprises a photoelectric conversion element, an amplification-use element, a transfer-use element for transferring a photoelectric charge from the photoelectric conversion element to an input part of the amplification-use element, and a reset-use element for resetting the input part of the amplification-use element, and
the control unit controls the pixel control unit, readout unit and shutter unit so as to have the shutter unit establish a state of shielding the pixel unit from a light and resets the photoelectric conversion element by controlling the reset-use element and transfer-use element for each pixel of the plurality of pixels, followed by having the shutter unit establish a state of a light incident to the pixel unit and performs a simultaneous exposure at the plurality of pixels, followed by having the shutter unit establish a state of shielding the pixel from a light and reading out a first signal output by way of the amplification-use element by controlling the reset-use element, followed by reading out a second signal output by way of the amplification-use element by controlling the transfer-use element and followed by subtracting the first signal from the second signal for each pixel of the plurality of pixels in the case of being changed over to a first exposure mode by the exposure mode changeover unit.

2. The solid-state image pickup apparatus according to claim 1, wherein
the control unit further comprises a photographing mode changeover unit for changing over a photographing mode to either a first photographing mode for photographing a still image or a second photographing mode for photographing a moving image, and
the exposure mode changeover unit changes over the exposure mode to the first exposure mode in the case of the photographing mode changeover unit changing over the photographing mode to the first photographing mode, or to the second exposure mode in the case of the photographing mode changeover unit changing over the photographing mode to the second photographing mode.

3. The solid-state image pickup apparatus according to claim 1, wherein
the exposure mode changeover unit changes over the exposure mode to the first exposure mode in the case of an exposure time which is obtained by according to a brightness of an object exceeding a predefined length of time, or changes over the exposure mode to the second exposure mode in the case of the exposure time not exceeding the predefined length of time.

4. The solid-state image pickup apparatus according to claim 1, wherein
the control unit controls so as to reset the photoelectric conversion element simultaneously in the plurality of pixels.

5. The solid-state image pickup apparatus according to claim 1, wherein
the shutter unit is a liquid crystal shutter.

6. A solid-state image pickup apparatus, comprising:
a pixel unit including a plurality of pixels;
a pixel control unit for controlling the plurality of pixels;
a readout unit for reading a signal of each pixel output from the pixel unit;
a shutter unit for establishing a state of a light incident to the pixel unit and that of shielding the pixel unit from the light; and
a control unit, comprising an exposure mode changeover unit for changing over an exposure mode to either a first exposure mode performing a simultaneous exposure for all pixels or a second exposure mode performing an exposure for each of a predetermined unit of pixels, for controlling the pixel control unit, readout unit and shutter unit according to an exposure mode changed over by the exposure mode changeover unit, wherein
the pixel unit is one in which each pixel comprises a photoelectric conversion element, an amplification-use element, a transfer-use element for transferring a photoelectric charge from the photoelectric conversion element to an input part of the amplification-use element, and a reset-use element for resetting the input part of the amplification-use element, and
the control unit controls the pixel control unit, readout unit and shutter unit so as to have the shutter unit establish a state of a light incident to the pixel unit and resets the photoelectric conversion element by controlling the reset-use element and transfer-use element; followed by performing an exposure, followed by reading out a first signal output by way of the amplification-use element by controlling the reset-use element, followed by reading out a second signal output by way of the amplification-use element by controlling the transfer-use element, and followed by subtracting the first signal from the second signal by each of the predetermined units of pixels for each pixel of the plurality of pixels in the case of being changed over to a second exposure mode by the exposure mode changeover unit.

7. The solid-state image pickup apparatus according to claim 6, wherein
the shutter unit is a liquid crystal shutter.

8. A control method for a solid-state image pickup apparatus comprising:
providing the apparatus that comprises
a pixel unit including a plurality of pixels,
a pixel control unit for controlling the plurality of pixels,
a readout unit for reading a signal of each pixel output from the pixel unit,
a shutter unit for establishing a state of a light incident to the pixel unit and that of shielding the pixel unit from the light, and
an exposure mode changeover unit for changing over an exposure mode to either a first exposure mode performing a simultaneous exposure for all pixels or a second exposure mode performing an exposure for each of a predetermined unit of pixels, wherein the pixel unit is one in which each pixel comprises a photoelectric conversion element, a transfer-use element, a reset-use element, an amplification-use element and a selection-use element; and controlling the pixel control unit, readout unit and shutter unit, the controlling includes establishing a state of shielding the pixel unit from a light with the shutter unit and resetting the photoelectric conversion element using the reset-use element and transfer-use element for each pixel of the plurality of pixels, establishing a state of a light incident to the pixel unit with the shutter unit and performing a simultaneous exposure at the plurality of pixels, and establishing a state of shielding the pixel from a light with the shutter unit, and reading out a first signal output using the reset-use element and selection-use element, followed by reading out a second signal output using the transfer-use element and selection-use element, and followed by subtracting the first signal from the second signal for each pixel of the plurality of pixels, in the case of being changed over to a first exposure mode by the exposure mode changeover unit.

9. The control method for a solid-state image pickup apparatus according to claim 8, wherein the solid-state image pickup apparatus further comprises a photographing mode changeover unit for changing over a photographing mode to either a first photographing mode for photographing a still image or a second photographing mode for photographing a moving image, and the control method further comprises changing over the exposure mode, with the exposure mode changeover unit, to the first exposure mode in the case of the photographing mode changeover unit changing over the photographing mode to the first photographing mode, or to the second exposure mode in the case of the photographing mode changeover unit changing over the photographing mode to the second photographing mode.

10. The control method for a solid-state image pickup apparatus according to claim 8, further comprising changing over the exposure mode, with the exposure mode changeover unit, to the first exposure mode in the case of an exposure time which is obtained by according to a brightness of an object exceeding a predefined length of time, or to the second exposure mode in the case of the exposure time not exceeding the predefined length of time.

11. The control method for a solid-state image pickup apparatus according to claim 8, controlling so as to reset the photoelectric conversion element simultaneously at the plurality of pixels.

12. The control method for a solid-state image pickup apparatus according to claim 8, wherein the shutter unit is a liquid crystal shutter.

13. A control method for a solid-state image pickup apparatus comprising:

providing the apparatus that comprises a pixel unit including a plurality of pixels, a pixel control unit for controlling the plurality of pixels, a readout unit for reading a signal of each pixel output from the pixel unit, a shutter unit for establishing a state of a light incident to the pixel unit and that of shielding the pixel unit from the light, and an exposure mode changeover unit for changing over an exposure mode to either a first exposure mode performing a simultaneous exposure for all pixels or a second exposure mode performing an exposure for each of a predetermined unit of pixels, wherein the pixel unit is one in which each pixel comprises a photoelectric conversion element, a transfer-use element, a reset-use element, an amplification-use element and a selection-use element; and controlling the pixel control unit, readout unit and shutter unit, the controlling includes establishing a state of a light incident to the pixel unit with the shutter unit, and resetting the photoelectric conversion element using the reset-use element and transfer-use element, followed by performing an exposure, followed by reading out a first signal output using the reset-use element and selection-use element, followed by reading out a second signal output using the transfer-use element and selection-use element, and followed by subtracting the first signal from the second signal by each of the predetermined unit of pixels for each pixel of the plurality of pixels in the case of being changed over to a second exposure mode by the exposure mode changeover unit.

14. The control method for a solid-state image pickup apparatus according to claim 13, wherein the shutter unit is a liquid crystal shutter.

\* \* \* \* \*